Figure 1:
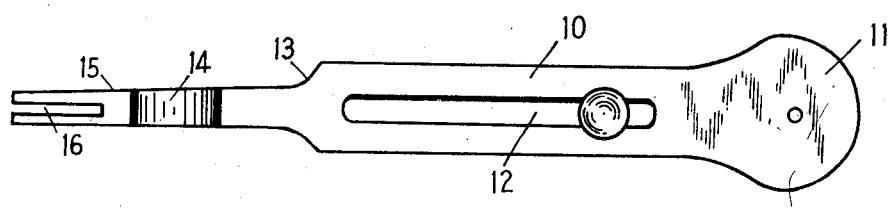

July 14, 1931.　　　　P. JOFFÉ　　　　1,814,044
INSTRUMENTALITIES FOR ANNEXING TIPS TO TOOTH FACINGS
Filed July 14, 1928

Peter Joffé
INVENTOR

Patented July 14, 1931

1,814,044

UNITED STATES PATENT OFFICE

PETER JOFFÉ, OF NEW YORK, N. Y.

INSTRUMENTALITIES FOR ANNEXING TIPS TO TOOTH FACINGS

Application filed July 14, 1928. Serial No. 292,801.

This invention relates to improvements in instrumentalities used in connection with dental work, and has for its purpose to provide a simple, efficient and inexpensive invention for this purpose.

One of the objects of my invention is to provide a tool with accessories designed to retain a tooth facing while the dental technician or dentist manipulates this tooth facing for annexing a tip of proper configuration thereto.

In another application I have disclosed a novel method of annexing to a tooth facing a tip made of the same homogeneous composition as the tooth facing itself, so that when the tip shall have been shaped around this tooth facing, no gold will show up at the extremity of the tip, a condition which prevails today in practice where the tip does reveal and conspicuously display the gold tip extremity. For æsthetic reasons this displaying of the gold tip is objectionable and it is an object of my invention to overcome this shortcoming and to provide certain aids by which the person skilled in the dental art can quickly, economically and effectively mold a porcelain or other composition tip to the tooth facing requiring the same.

Another object of my invention is to provide a tooth facing with a non-metallic tip, the tip being applied by the aid of certain instrumentalities devised by me. In carrying out the method these instrumentalities include a special type and shape of pliers provided with resilient flat-faced terminals, the terminals being designed to retain the tooth facing while the tip is being molded thereupon. Another instrumentality provided is what is called herein a master backing, which is a backing for a tooth facing of construction partly similar to standard backing with the addition thereto of an angular shelf providing a base against which the tip is anchored, a screw bolt with an adjusting nut thereon, the latter as a means of attachment to one terminal of the pliers.

Another object of my invention is to provide in connection with the master backing for tooth facings means for measuring the width or thickness of the tip to be molded or shaped upon the facing. To this end I inscribe upon the angular shelf of the backing, a series of lines each calibrated with an indicating number, so that when the tooth facing is clamped between the terminals of the pliers as devised by me, with the tooth facing engaging the rubber cushion as well as the master backing, the tip can then be shaped out of any desirable composition, and as the composition is applied to the tooth facing and anchored against the calibrated surface of the shelf of the master backing, surplus material can be wiped or otherwise removed from the tip, to make it register with any calibrated line on this shelf.

Another object of my invention is to provide a novel cushion for engagement with the tooth facing as the latter is retained between the terminals of the pliers, this cushion designed to have lateral grooves and a medial neck, so by sliding the neck into the slit of either terminal of the pliers the rubber cushion is positioned in set position upon this terminal, thus leaving the hands of the dental technician free to apply the master backing to the other terminal and by means of the bolt and nut on the latter to clamp this master backing to the plier terminals.

With the above and other objects in view my invention consists in the combination, arrangement, and details of construction disclosed in the drawings and specification, and then more particularly pointed out in the appended claims.

Figure 2:
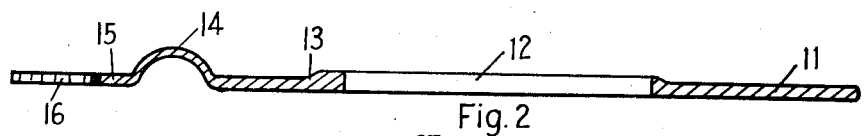
Figure 3:
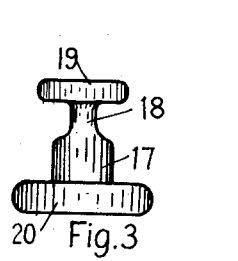
Figure 4:
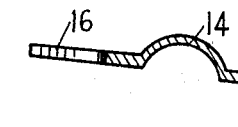
Figure 5:
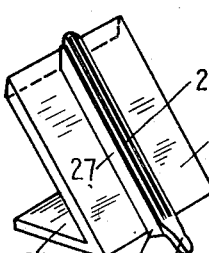
Figure 6:
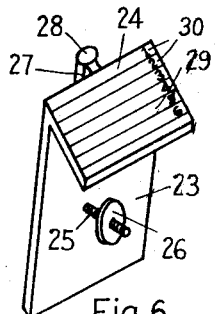
Figure 7:
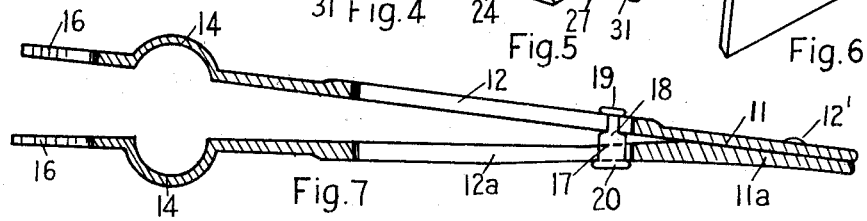
Figure 8:
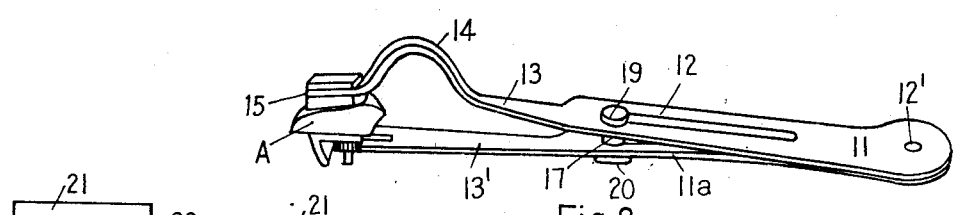
Figure 9:
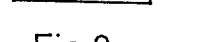
Figure 10:
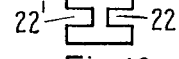
Figure 11:
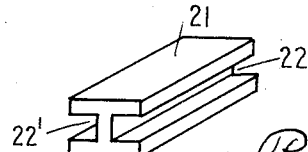

In the drawings, wherein similar reference characters designate similar parts throughout the respective views, Figure 1 is a top plan view of the pliers part of my invention, Figure 2 is a longitudinal section thru one jaw of the pliers, Figure 3 is a side elevation of a rivet for the pliers, Figure 4 is an end elevation of the master backing, Figure 5 is a perspective view of the master backing, Figure 6 is another perspective view of the master backing, Figure 7 is a longitudinal view of a pliers made in accordance with my invention, Figure 8 is a perspective view of the said pliers, Figure 9 is a side elevation of a cushion, Figure 10 is an end elevation of said cushion, Figure 11 is a perspective view of said cushion.

In the drawings, wherein similar reference characters designate similar views, and in which the parts are merely illustrative of my invention 10 designates the flat surface of the pliers to be described. Two flat-faced jaws or stems are provided having their inner base portions 11, 11a secured in flat contact by a rivet or other fastener 12'. These jaws are formed resilient, and are normally disposed in a manner to cause their free ends to diverge. The jaws are formed intermediate their ends with elongated slots 12, 12a; short of their free ends these jaws may be formed with laterally disposed U-shaped portions 14, while the flat terminals 15 of the jaws are formed with narrow elongated slits 16.

A stud 17 is employed, and is reduced at 18, the reduced portion being formed upon a head or flange 19; the main body of the stud is formed into a head or flange 20 somewhat larger than the head 19. This stud projects into both slots 12, 12a of the resilient jaws of the pliers, and the stud is of a height less than the distance apart at which the terminals of the pliers are separated, so that when this stud is slid along into both slots from the inner towards the outer end of the pliers the necessary result is to draw or squeeze together the jaws.

I also provide what I term a "master" backing, which is similar in many respects to a backing for a tooth facing A but is improved in several particulars; for example a screw threaded bolt 25 is provided so as to project forwardly, say at right angles to the surface of the plate 23 of the backing, this plate being usually made of gold; a nut 26 screws upon this bolt 25; this backing includes a grooved stud or shank 27 extending medially of the rear surface of the plate 23 coextensively therewith, and it terminates at its lower end in a downwardly inclined pin 31. A key or tongue 28 is formed upon the lug or shank 27 and it is this part which carries the pin 31.

I also provide a rubber cushion in the shape of preferably an oblong block 21 which is H-shaped; in other words two longitudinal grooves 22, 22' are formed upon the opposing edges of this block 21 as shown in Figure 11.

These foregoing instrumentalities are all necessary for the purpose of facilitating the operation of annexing a tip to the tooth facing A, in a manner designed to prevent any gold showing at the tip edge. The dental mechanician is designed to manipulate the tooth facing to better advantage, holding the tooth facing in one hand while shaping the plastic composition of the tip with the other hand. This composition is not gold, or a metal but preferably a composition either simulating porcelain or porcelain itself.

In operation the person skilled in the dental art takes the rubber cushion 21, and inserts the neck thereof in the slit 16 of the terminal of one jaw of the pliers; this frictionally positions the rubber cushion in one jaw of the pliers; next the backing is taken and its screw bolt 25 is slipped into the slot 16 of the other jaw of the pliers; then the nut 26 is screwed home tight to clamp this backing securely upon this jaw. This positions the backing upon the pliers. In the act of positioning the cushion and the backing upon the terminals of the pliers, the jaws are still in diverged relation, with the stud 17 preferably disposed at the inner end of the pliers. The next step is to shift and move this stud towards the outer free ends of the pliers, and as this is done the jaws are drawn closer together, so the tooth facing a comes into contact with the rubber cushion 15 which protects this tooth facing; at this time the stud 17 may be at the outer end of the slots 12, 12a as shown in Figure 8.

The dental mechanician or dentist now holds the clamp in one hand; note that the angular shelf 24 is formed upon the master backing at an acute angle with respect to the main plate 23. Note also that upon the under surface of this shelf 24 is inscribed a series of measuring lines 29 in calibrated relation, opposite each line there being an indication numeral as at 30. This provides a vernier upon the under surface of the shelf 24, the latter functioning to provide an anchorage for the base of the tip to be annexed to the tooth facing A.

When now the person skilled in the art holds the pliers in his hand, the shelf of the master backing, as shown in Figure 8, inclines freely and downwardly. When the plastic composition, preferably of the same homogeneous make as the porcelain material of the tip is affixed to the lower extremity of the tooth facing A, it also clings against the shelf 24; in order to predetermine the thickness or width of the tooth facing, the material of this composition will be allowed to register with any of the lines 29 inscribed upon the shelf 24 of the master backing. After the tip shall have been properly shaped and molded, fired and glazed, using the skill necessary for this purpose, the completed tooth will not reveal at the extremity of the tip any trace of gold, and thus it will be hard to tell this artificial tooth from a natural tooth.

I do not intend to restrict myself to the exact details of construction disclosed herein, but intend to cover all variations falling within the purview of the appended claims.

What I claim and desire to secure by Letters Patent is:—

1. In a dental device for the purpose set forth, the combination of an adjustable clamping pliers for holding a tooth facing comprising two similarly shaped flat faced jaws secured in flat contact at one end, said jaws being resilient and capable of being flexed so as to be contracted, each of the free ends of the said jaws being provided with an elongated slit and a stud adapted to slide in the elongated channels positioned one in each of the said jaws substantially midway, to contract or open the free ends of the said jaws, with the heads of the stud overlying the channels; of a calibrated angled backing plate member provided with a medially positioned shank and tongue for engaging within the cooperative recess of the tooth facing adapted to be removably mounted upon one of the slit ends of the said plier jaws and a resilient clamping member for the tooth facing adapted to be removably mounted upon the other of the slit ends of the said plier jaws.

2. In a dental device for the purpose set forth, the combination of a two-jaw adjustable clamping plier, each jaw being provided with an elongated slit at the free end and an elongated channel positioned substantially midway, of a stud slidably retained in the channels of said jaws to contract or release the free ends of the jaws, of a calibrated angled backing plate member provided with an integrally formed shank and tongue for engaging within the cooperative recess of the tooth facing and adapted to be removably mounted upon one of the slit ends of the said plier jaw, and an H-shaped resilient cushion adapted to slide into the other slit end of the said plier jaw and be retained thereon for clamping against the tooth facing while it is seated upon the backing plate.

3. In a dental device for the purpose set forth, the combination of a clamping pliers provided with slit terminals, of a stud member operatively retained upon the jaws of said pliers for contracting or releasing the said jaws, of a calibrated angled backing plate member provided with means for seating thereon a tooth facing, of a screw bolt and nut member mounted upon said backing plate for removably joining the backing plate to one of the slit terminals of the clamping pliers and an H-shaped resilient member with its lateral grooves adapted to removably engage within the slit of the second terminal of the clamping pliers and provide the means for clamping the tooth facing upon the backing plate member.

In witness whereof he has hereunto set his hand this 3 day of September, 1927.

PETER JOFFÉ.